(12) United States Patent
Ye et al.

(10) Patent No.: US 8,684,585 B2
(45) Date of Patent: Apr. 1, 2014

(54) ILLUMINATION DEVICE AND LENS THEREOF

(75) Inventors: Zhi-Ting Ye, Miaoli County (TW); Kuo-Jui Huang, Taichung (TW)

(73) Assignees: Wintek (China) Technology Ltd., Guangdong Province (CN); Wintek Corporation, Taichung (TW)

(*) Notice: Subject to any disclaimer, the term of this patent is extended or adjusted under 35 U.S.C. 154(b) by 201 days.

(21) Appl. No.: 13/221,932

(22) Filed: Aug. 31, 2011

(65) Prior Publication Data

US 2012/0051061 A1    Mar. 1, 2012

(30) Foreign Application Priority Data

Aug. 31, 2010  (TW) .................................. 99129269 A

(51) Int. Cl.
*F21V 8/00*     (2006.01)
*F21V 5/04*     (2006.01)
*F21V 7/00*     (2006.01)

(52) U.S. Cl.
USPC ............ 362/615; 362/606; 362/608; 362/609

(58) Field of Classification Search
USPC ............ 362/296.01, 555, 558, 615, 606, 608, 362/609, 610
See application file for complete search history.

(56) References Cited

U.S. PATENT DOCUMENTS

| | | | |
|---|---|---|---|
| 7,001,060 B1 | 2/2006 | Kimura | |
| 7,034,343 B1 | 4/2006 | Kim et al. | |
| 7,106,523 B2 | 9/2006 | McLean et al. | |
| 7,153,002 B2 | 12/2006 | Kim et al. | |
| D542,743 S | 5/2007 | Jung et al. | |
| 7,224,537 B2 | 5/2007 | Choi | |
| D555,111 S | 11/2007 | Yen | |
| D559,432 S | 1/2008 | Moriyama et al. | |

(Continued)

FOREIGN PATENT DOCUMENTS

| | | |
|---|---|---|
| CN | 1504803 | 6/2004 |
| CN | 101067663 | 11/2007 |

(Continued)

OTHER PUBLICATIONS

"First Office Action of China counterpart application" issued on Nov. 23, 2012, p. 1-p. 5, in which the listed references were cited.

(Continued)

*Primary Examiner* — Karabi Guharay
(74) *Attorney, Agent, or Firm* — Jianq Chyun IP Office

(57) ABSTRACT

An illumination device and a lens thereof are provided. The lens includes a surrounding sidewall, a light-incident surface, a light-incident structure, and a light-emitting surface. The surrounding sidewall includes two planar portions opposite to each other and two arc-surface portions opposite to each other to surround a reference axis. The light-incident surface is located at a side of the surrounding sidewall to receive a light emitted from a point light source. The light-incident structure located on the light-incident surface includes a plurality of bar-shaped protrusions. Each bar-shaped protrusion includes a plurality of first light-diffusing surfaces not parallel to the light-incident surface. The light-emitting surface is located at the other side of the surrounding sidewall and is opposite to the light-incident surface. The light-emitting surface is substantially circular. A cross-section area of the lens gradually increases from the light-incident surface to the light-emitting surface.

10 Claims, 8 Drawing Sheets

(56) References Cited

U.S. PATENT DOCUMENTS

| | | | |
|---|---|---|---|
| 7,414,270 B2 | 8/2008 | Kim et al. | |
| 7,524,089 B2 | 4/2009 | Park | |
| 7,580,192 B1 | 8/2009 | Chu et al. | |
| 7,832,878 B2 * | 11/2010 | Brukilacchio et al. | 353/99 |
| 2005/0117366 A1 | 6/2005 | Simbal | |
| 2006/0013017 A1 * | 1/2006 | Yu et al. | 362/615 |
| 2007/0047232 A1 | 3/2007 | Kim et al. | |
| 2008/0031011 A1 * | 2/2008 | Hayashi et al. | 362/617 |
| 2010/0118531 A1 * | 5/2010 | Montagne | 362/235 |

FOREIGN PATENT DOCUMENTS

| | | |
|---|---|---|
| DE | 102006004996 | 8/2006 |
| EP | 1376708 | 1/2004 |
| EP | 1811225 | 7/2007 |
| JP | 2003-204083 | 7/2003 |
| TW | M340399 | 9/2008 |
| TW | D125388 | 10/2008 |
| TW | D125617 | 10/2008 |
| TW | M352000 | 3/2009 |
| TW | M356069 | 5/2009 |
| TW | D130133 | 8/2009 |

OTHER PUBLICATIONS

"Office Action of German Counterpart Application", issued on Jul. 6, 2012, with English translation thereof, p. 1-p. 9, in which the listed references were cited.

* cited by examiner

ILLUMINATION DEVICE AND LENS THEREOF

CROSS-REFERENCE TO RELATED APPLICATION

This application claims the priority benefit of Taiwan application serial no. 99129269, filed Aug. 31, 2010. The entirety of the above-mentioned patent application is hereby incorporated by reference herein and made a part of this specification.

BACKGROUND OF THE INVENTION

1. Field of the Invention

The invention relates to a lens and an illumination device. More particularly, the invention relates to an illumination device having a lens with a light-incident structure.

2. Description of Related Art

A light emitting diode (LED) is a semiconductor device. The service life of the LED often exceeds a hundred thousand hours, and the LED does not require idling time. Moreover, the LED has the advantages of fast response speed (about $10^{-9}$ seconds), compact size, low power consumption, low pollution, high reliability, capability for mass production, etc. Therefore, the application of the LED is fairly extensive, for example, mega-size outdoor display boards, traffic lights, cell phones, light sources of scanners and facsimile machines, illumination devices, and so forth.

Since the brightness and the light-emitting efficiency of the LED continue to increase, and mass production of the white LED succeeds, the LED has been gradually applied for illumination. The LED often serves as a point light source. However, the light source for illumination is required to cover a relatively large area in most cases. Hence, when the LED acts as an illumination device, a light-diffusing structure, e.g., a lens unit, is required for resolving the issue of overly concentrated light from the point light source.

FIG. 8 is a portion of a conventional illumination device having a lens unit. Here, the lens unit is a lens 120' which is formed by removing the top portion of a cone. When light L1' irradiates the sidewall of the lens 120', the light L1' is reflected to a reflective layer 140'. Nonetheless, the light L2' reflected by the sidewall of the lens 120' may be transmitted out of the reflective layer 140' and thus cannot be utilized effectively. As a result, the conventional lens unit encounters the issue of low light utilization rate.

SUMMARY OF THE INVENTION

The invention is directed to a lens which can adjust a light path for improving a light utilization rate of an illumination device.

The invention is further directed to an illumination device that can effectively utilize a light source and improve light-emitting efficiency.

In an embodiment of the invention, a lens is provided. The lens includes a surrounding sidewall, a light-incident surface, a light-incident structure, and a light-emitting surface. The surrounding sidewall includes two planar portions and two arc-surface portions to surround a reference axis. Here, the two planar portions are opposite to each other, and the two arc-surface portions are opposite to each other. The light-incident surface is located at a side of the surrounding sidewall to receive a light emitted from a point light source. The light-incident structure is located on the light-incident surface and includes a plurality of bar-shaped protrusions. Each of the bar-shaped protrusions includes a plurality of first light-diffusing surfaces which are not parallel to the light-incident surface. The light-emitting surface is located at the other side of the surrounding sidewall and is opposite to the light-incident surface. Besides, the light-emitting surface is substantially circular. A cross-section area of the lens gradually increases from the light-incident surface to the light-emitting surface.

In an embodiment of the invention, an illumination device which includes the aforesaid lens, a light guide cylinder, and a reflective layer is provided. The light guide cylinder is configured at a side of the lens away from the point light source and is substantially aligned to the reference axis. The reflective layer is configured at a side of the light guide cylinder. The reflective layer and one of the two planar portions are located at the same side of the reference axis.

Based on the above, the two opposite planar portions are configured on a sidewall of the lens, and the planar portions correspond to the reflective layer of the illumination device. Hence, the light emitted from the point light source can substantially irradiate the reflective layer, which is conducive to improvement of light-emitting efficiency of the illumination device. In addition, the light-incident surface of the lens has the light-incident structure, which can diffuse the light emitted from the point light source for utilization.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
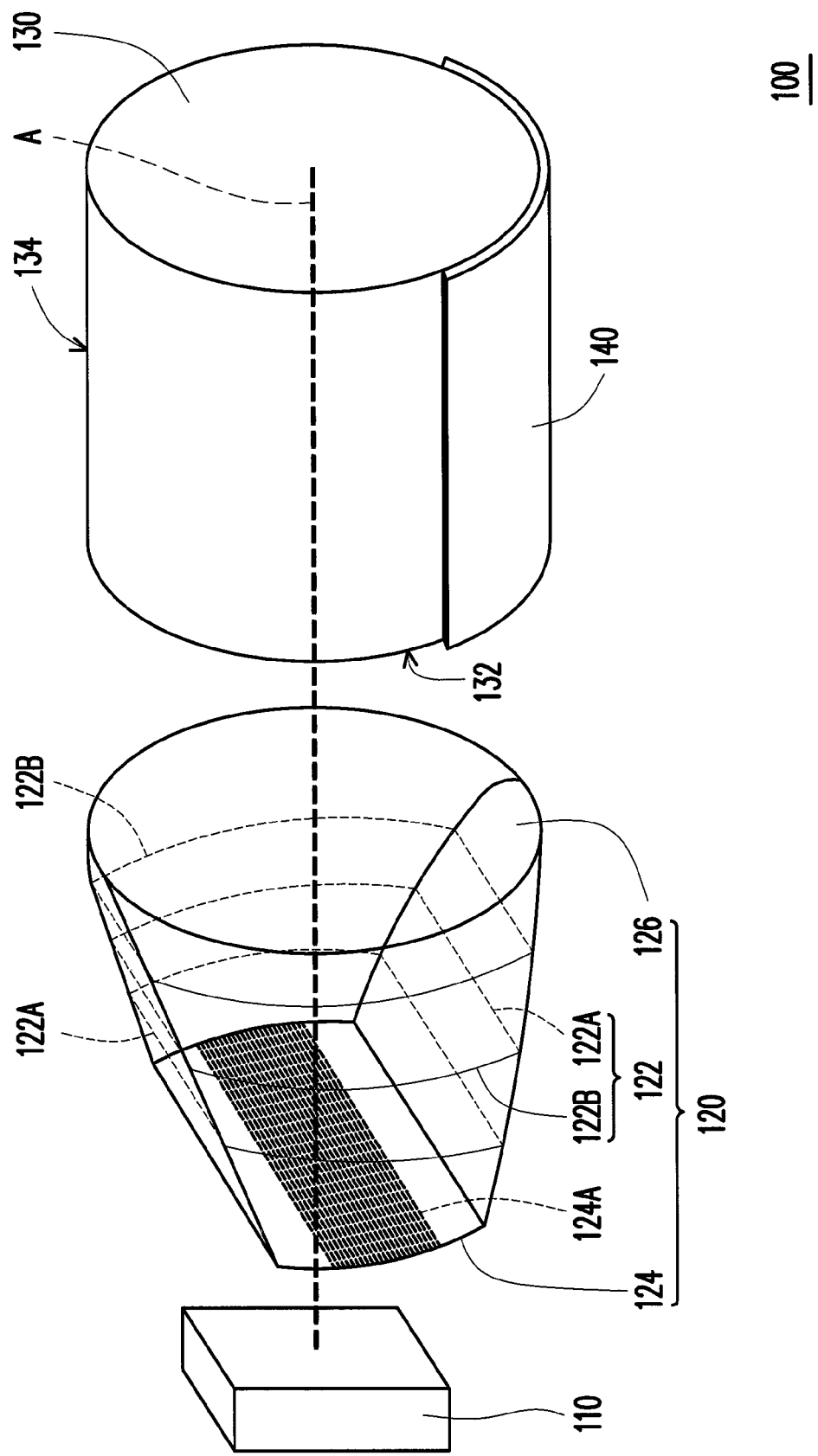
FIG. 1 is a schematic explosive view illustrating an illumination device according to an embodiment of the invention.

FIG. 1 is a schematic explosive view illustrating an illumination device according to an embodiment of the invention. With reference to FIG. 1, the illumination device 100 includes a point light source 110, a lens 120, a light guide cylinder 130, and a reflective layer 140. The point light source 110, the lens 120, and the light guide cylinder 130 are sequentially arranged on a reference axis A, for instance. In this embodiment, the reference axis A passes the center of the point light source 110, the center of the lens 120, and the center of the light guide cylinder 130, for instance. The reflective layer 140, e.g., a diffusive reflective layer made of a white ink layer, is located on a portion of the surface 132 of the light guide cylinder 130. The other portion of the surface of the light guide cylinder 130 opposite to the reflective layer 140 is the light-emitting surface 134 in substance. Namely, the illumination device 100 can provide the linear light source.

Specifically, the point light source 110 is an LED light source, for instance. In order to diffuse the light emitted from the point light source 110, have the diffused light enter the light guide cylinder 130, and provide the required linear light source, the lens 120 in the illumination device 100 need be configured between the point light source 110 and the light guide cylinder 130. After the lens 120 diffuses the light emitted from the point light source 110 and the diffused light enters the light guide cylinder 130, a portion of the light can be emitted from the light guide cylinder 130 through the light-emitting surface 134, while the other portion of the light can irradiate the reflective layer 140 and then be reflected to the light-emitting surface 134 by the reflective layer 140.

In this embodiment, the lens 120 includes a surrounding sidewall 122, a light-incident surface 124, a light-incident structure 124A, and a light-emitting surface 126. The light-incident surface 124 is configured at a side of the surrounding sidewall 122 and faces the point light source 110 for receiving the light emitted from the point light source 110. The light-incident structure 124A is located on the light-incident surface 124 to provide a rough structure that can diffuse the light emitted from the point light source 110. The light-emitting surface 126 is substantially circular. Besides, the light-emitting surface 126 is configured at the other side of the surrounding sidewall 122 and opposite to the light-incident surface 124. Here, the light-emitting surface 126 is opposite to an end of the light guide cylinder 130. An area of the light-emitting surface 126 is substantially similar to the cross-section area of the light guide cylinder 130. A cross-section area of the lens 120 gradually increases from the light-incident surface 124 to the light-emitting surface 126.

It should be mentioned that the surrounding sidewall 120 of this embodiment includes two planar portions 122A and two arc-surface portions 122B to surround the reference axis A. Here, the two planar portions 122A are opposite to each other, and the two arc-surface portions 122B are opposite to each other. The reflective layer 140 and one of the two planar portions 122A that is configured adjacent to the reflective layer 140 are located at the same side of the reference axis A. The light emitted from the point light source 110 can be diffused by the lens 120 and enter the light guide cylinder 130. In addition, the two planar portions 122A can reflect the light to the reflective layer 140, so as to further improve the light utilization rate. Thus, the lens 120 contributes to the improvement of the light-emitting efficiency of the illumination device 100.

Figure 2:
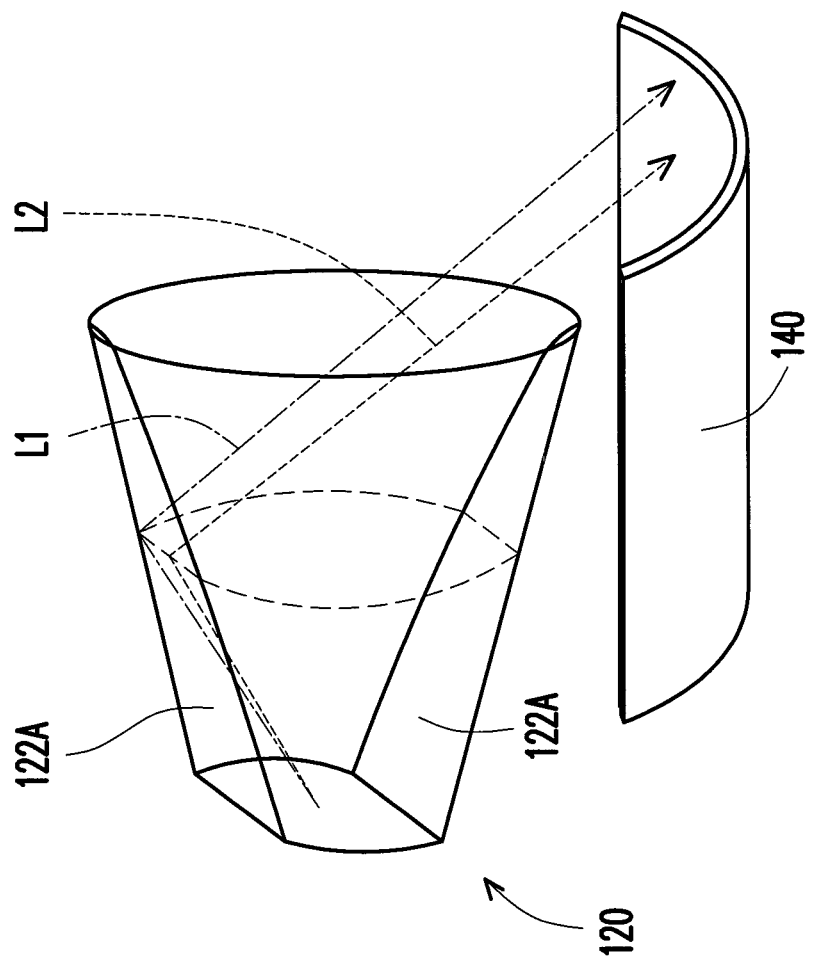
FIG. 2 is a schematic view illustrating an optical operation of a lens according to an embodiment of the invention.
Figure 8:
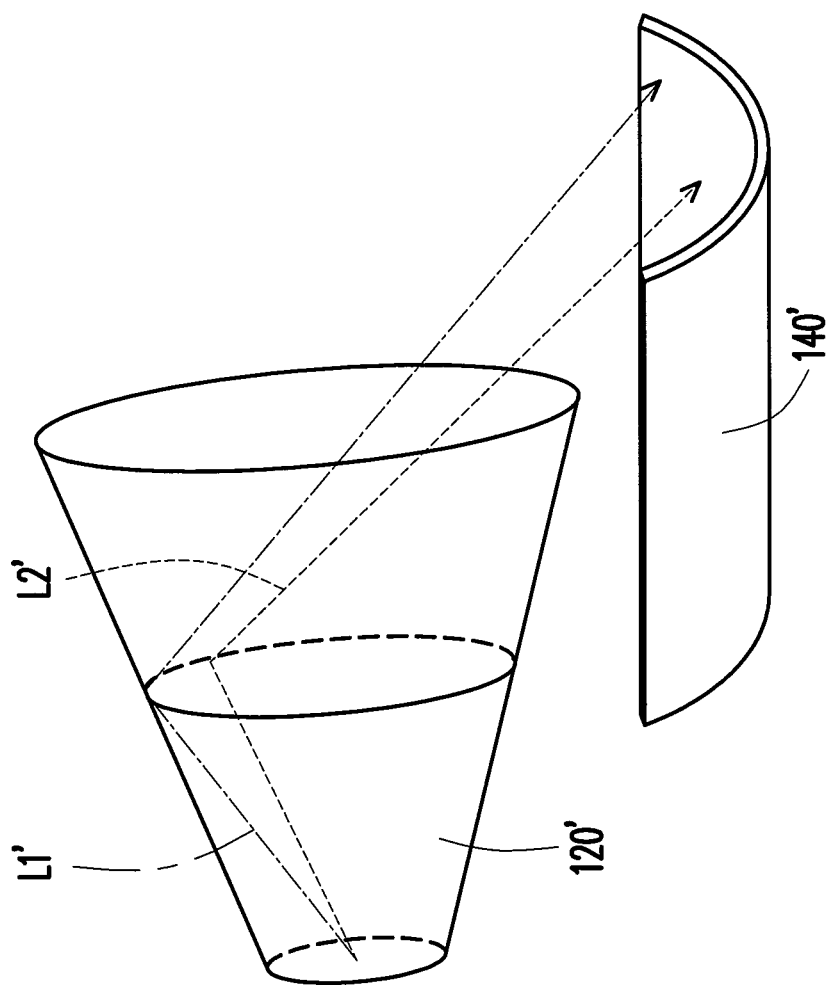
FIG. 8 is a portion of a conventional illumination device having a lens unit.

FIG. 2 is a schematic view illustrating an optical operation of a lens according to an embodiment of the invention. In this embodiment, the lens 120 has two opposite planar portions 122A, and one of the planar portions 122A is adjacent to the reflective layer 140. Hence, the other planar portion 122A and the reflective layer 140 are respectively located at two opposite sides of the reference axis A. After the light L1 and the light L2 are reflected by the planar portions 122A, the light L1 and the light L2 can both irradiate the reflective layer 140 and effectively utilized. Based on the result of actual measurement, on the same conditions (e.g., when the point light source with 150 lumens is given), the light-emitting efficiency of the illumination device in which the conventional lens 120' depicted in FIG. 8 is applied is approximately 55.8 lm/w, while the light-emitting efficiency of the illumination device 100 in which the lens 120 of this embodiment is applied is approximately 66.27 lm/w. Hence, the planar portions 122A of this embodiment can apparently improve the light utilization rate.

Figure 3:
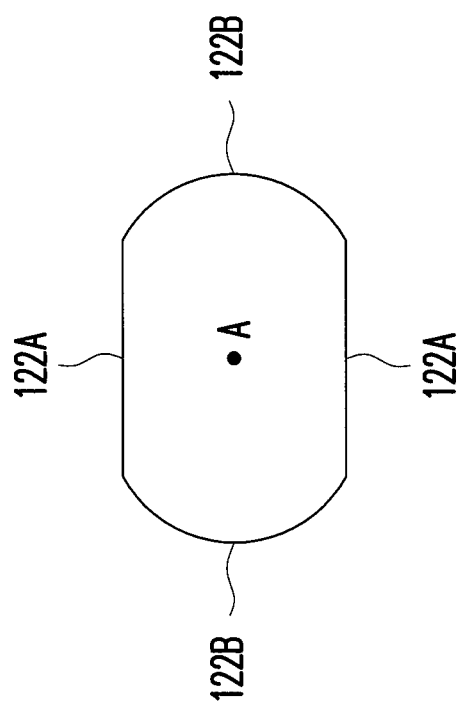
FIG. 3 shows a cross-section area of a lens according to an embodiment of the invention when a reference axis is taken as a normal line.

FIG. 3 shows a cross-section area of a lens according to an embodiment of the invention when a reference axis is taken as a normal line. With reference to FIG. 1 and FIG. 3, when the reference axis A is taken as a normal line to illustrate the cross-section area of the lens 120, the two planar portions 122A in the cross-section area are formed by the straight line portions parallel to each other, the two arc-surface portions 122B are symmetrical to each other, and distances from the two arc-surface portions 122B to the reference axis A are equal. Besides, the distances from the two arc-surface portions 122B to the reference axis A are greater than the distances from the two planar portions 122A to the reference axis A. That is to say, the cross-section area is the remaining section of a circle taking the reference axis A as a center after the circle is intersected by two parallel lines. To be more specific, the lens 120 is substantially a frustum formed by intersecting a cone with two oblique planes. The lens 120 not only can be formed by intersecting a cone but also can be formed in a one-time molding process with use of specific molding tools.

With reference to FIG. 1, in this embodiment, the shape of the lens 120 is conducive to diffusion of the light emitted from the point light source 110. Moreover, the light-incident structure 124A configured on the light-incident surface 124 contributes to diffusion of the light emitted from the point light source 110. Particularly, the light-incident structure 124A on the light-incident surface 124 provides an uneven structure. When light is affected by the light-incident structure 124A and thus diffused, the issue of the overly concentrated light can be resolved.

Figure 4:
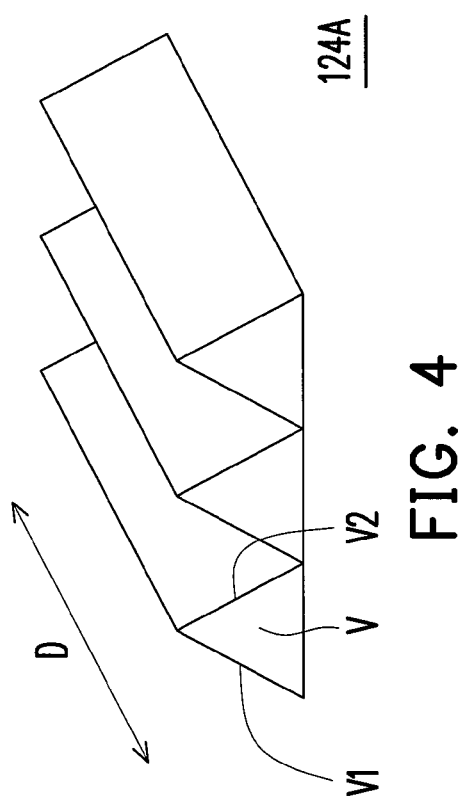
FIG. 4 and FIG. 5 are schematic views illustrating the light-incident structures.
Figure 5:
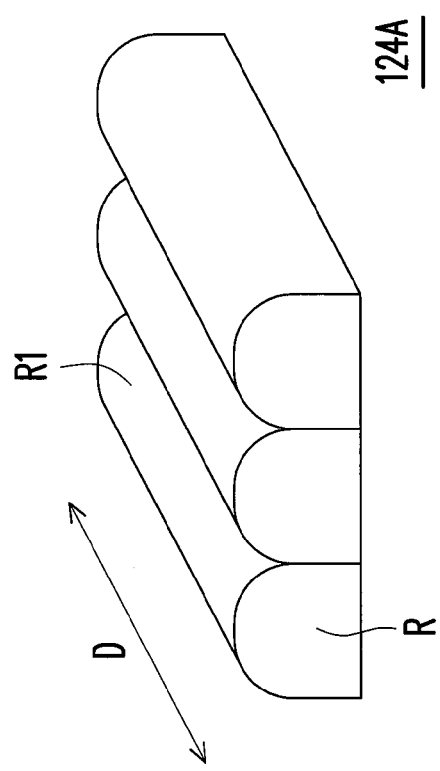

FIG. 4 and FIG. 5 are schematic views illustrating the light-incident structures. As shown in FIG. 4 and FIG. 5, the light-incident structure 124A can include a plurality of bar-shaped protrusions V or a plurality of bar-shaped protrusions R. Each of the bar-shaped protrusions V includes two planar light-diffusing surfaces V1 and V2, for instance. Alternatively, each of the bar-shaped protrusions R includes an arc-shaped light-diffusing surface R1. In the lens 120, the light-diffusing surfaces V1, V2, and R1 are not parallel to the light-incident surface 124. Certainly, in other embodiments of the invention, the light-incident structure 124A can simultaneously include the bar-shaped protrusions V and the bar-shaped protrusions R. Here, each of the bar-shaped protrusions V and R has an extension direction D. A cross-section area of each of the bar-shaped protrusions V which takes the extension direction D as a normal line has a V-shaped profile. A cross-section area of each of the bar-shaped protrusions R which takes the extension direction D as a normal line has an arc-shaped profile. In other embodiments of the invention, a cross-section area of each of the bar-shaped protrusions (not shown) which takes the extension direction D as the normal line can have a polygonal profile. Namely, the shape of the light-incident structure 124A is not limited in this embodiment. Undoubtedly, the dimension of each of the bar-shaped protrusions V and R can be modified based on different requirements.

Figure 6A:
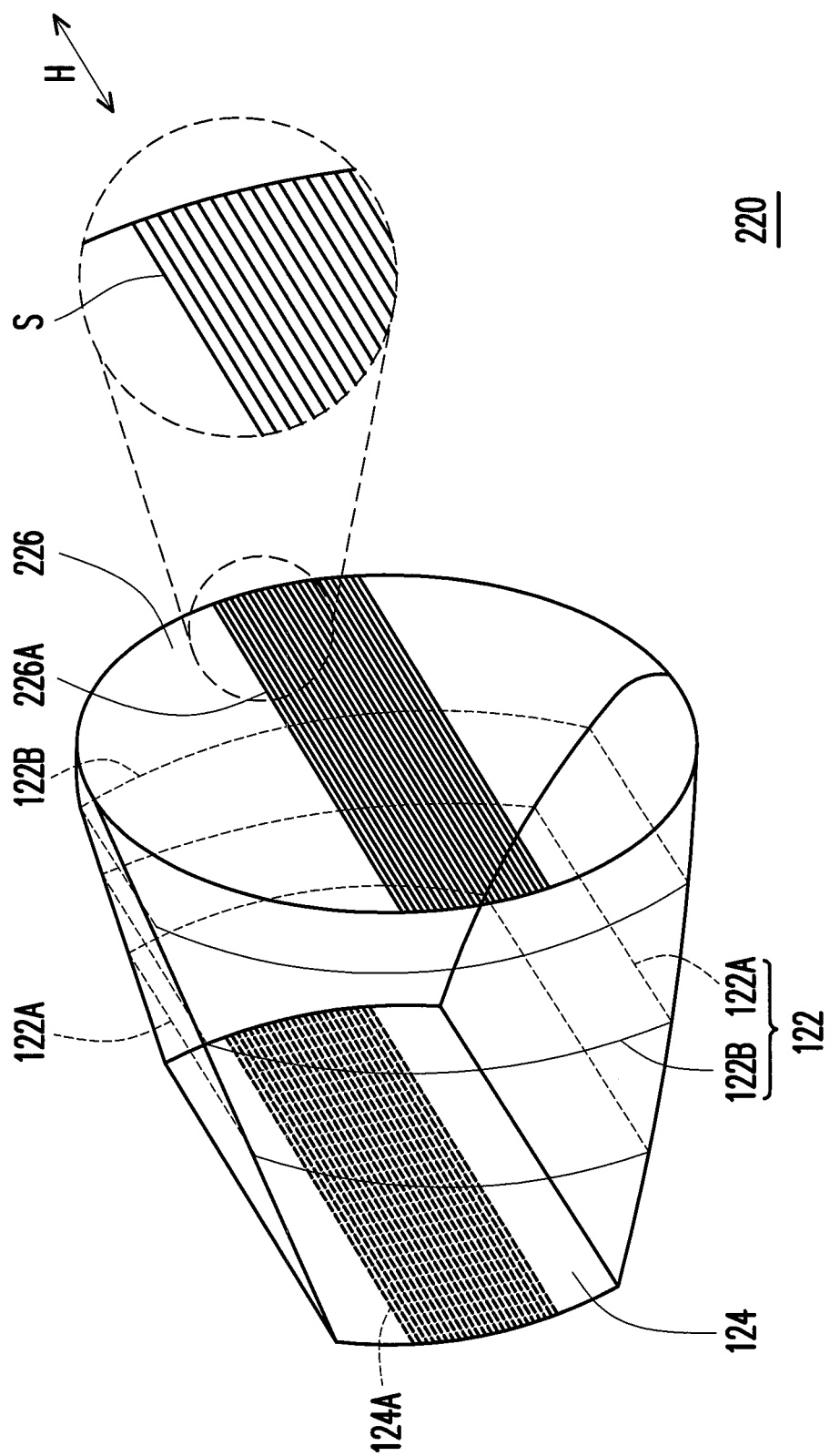
FIG. 6A is a schematic view illustrating a lens according to another embodiment of the invention.

FIG. 6A is a schematic view illustrating a lens according to another embodiment of the invention. With reference to FIG. 6A, the lens 220 is similar to the lens 120, while the difference therebetween lies in that the light-emitting surface 226 of the lens 220 has a light-emitting structure 226A. The lens 220 and the lens 120 have similar structures except for the light-emitting surface 226, and the same structures of the lenses 220 and 120 are represented by the same reference numbers and are not reiterated herein.

In this embodiment, the light-emitting structure 226A includes a plurality of bar-shaped protrusions S, for instance, and each of the bar-shaped protrusions S extends along an extension direction H. A cross-section area of each of the bar-shaped protrusions S which takes the extension direction H as a normal line can have a V-shaped profile, an arc-shaped profile, or a polygonal profile. Here, the V-shaped profile and the arc-shaped profile can refer to those depicted in FIG. 4 and FIG. 5. Namely, each of the bar-shaped protrusions S can include two planar light-diffusing surfaces or an arc-shaped light-diffusing surface. Besides, the extension direction H of the light-emitting structure 226A is substantially parallel to the extension direction of the light-incident structure 124A in this embodiment. However, the invention is not limited thereto. According to other embodiments of the invention, the extension direction H of the light-emitting structure 226A can be substantially perpendicular to the extension direction of the light-incident structure 124A, or the extension direction H of the light-emitting structure 226A can intersect the extension direction of the light-incident structure 124A at a certain angle. The configuration of the light-emitting structure 226A can further diffuse the light emitted from the point light source, which leads to an improvement of the light utilization rate of the illumination device.

Figure 6B:
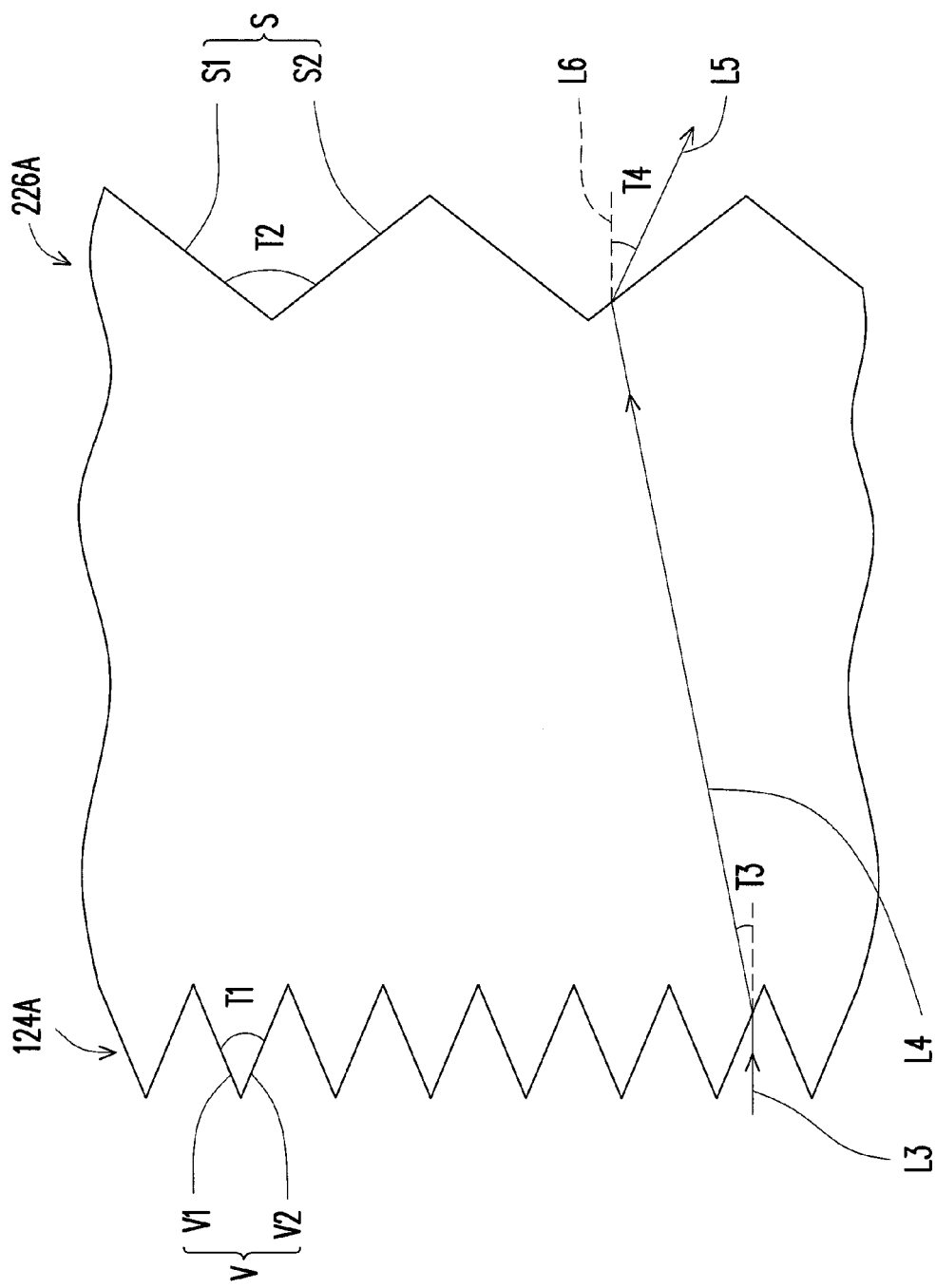
FIG. 6B is a schematic view illustrating a path of light entering the lens depicted in FIG. 6A. Here, the light enters the lens from a light-incident structure and emits from a light-emitting structure.

FIG. 6B is a schematic view illustrating a path of light entering the lens depicted in FIG. 6A. Here, the light enters the lens from the light-incident structure 124A and emits from the light-emitting structure 226A. With reference to FIG. 6A and FIG. 6B, the bar-shaped protrusions V of the light-incident structure 124A have the V-shaped cross-section area, for instance, and each of the bar-shaped protrusions V has the light-diffusing surfaces V1 and V2. Similarly, the bar-shaped protrusions S of the light-emitting structure 226A have the V-shaped cross-section area, for instance, and each of the bar-shaped protrusions S has the light-diffusing surfaces S1 and S2. In this embodiment, an included angle T1 between the two adjacent light-diffusing surfaces V1 and V2 is less than an included angle T2 between the two adjacent light-diffusing surfaces S1 and S2, for instance.

The path of light from the point light source to the light-incident structure 124A is defined as the first light path L3, and the path of light from the light-incident structure 124A to the light-emitting structure 226A is defined as the second light path L4. The path of light emitted from the light-emitting structure 226A is defined as the third light path L5. After the light enters the light-incident structure 124A, the light is refracted for the first time because the refractive index of the external surroundings is different from the refractive index of the lens, and the refracted light keeps on moving in the lens. When the light emits from the light-emitting structure 226A, the light is again refracted because the refractive index of the external surroundings is different from the refractive index of the lens. It can be clearly observed from FIG. 6B that the included angle between the extended first light path L3 and the second light path L4 is T3, and an included angle between the third light path L5 and a dummy line L6 parallel to the first light path L3 is T4. The included angle T4 is greater than the included angle T3.

Figure 7:
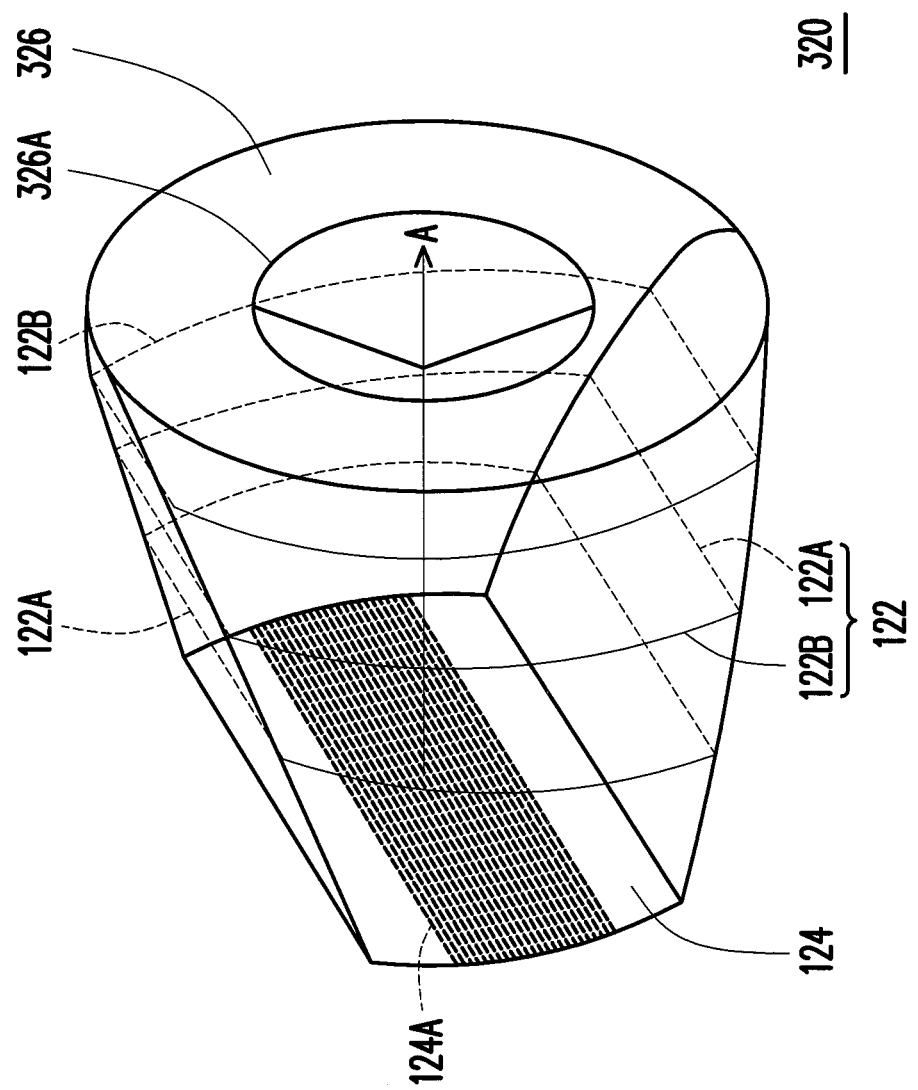
FIG. 7 is a schematic view illustrating a lens according to another embodiment of the invention.

The light-emitting structure not only can be a bar-shaped structure as described above but also can be a recess, as indicated in FIG. 7. FIG. 7 is a schematic view illustrating a lens according to another embodiment of the invention. With reference to FIG. 7, the lens 320 is similar to the lens 120, while the difference therebetween lies in that the light-emitting surface 326 of the lens 320 has a light-emitting structure 326A, and the light-emitting structure 326A is a recess in substance. Hence, the same reference numbers in FIG. 7 and FIG. 1 represent the same components.

In this embodiment, the reference axis A substantially passes the center of the light-emitting structure 326A (i.e., the recess). Therefore, a distance from any point of the light-emitting structure 326A to the light-incident surface 124 decreases together with a decrease in a distance from the point of the light-emitting structure 326A to the reference axis A. That is to say, the depth of the recess increases when the distance to the reference axis A decreases. Thereby, the light-emitting structure 326A can diffuse the light and enhance the light-emitting efficiency of the illumination device. It should be mentioned that the dimension of the recess and the recess direction can be determined based on actual requirements. The center of the aforesaid recess is located on the reference axis A in this embodiment, while the center of the recess may not be located on the reference axis A in other embodiments of the invention.

In light of the foregoing, according to this invention, a lens is configured between the light guide cylinder and the point light source, and a reflective layer is configured at a side of the light guide cylinder to form an illumination device. There are two planar portions on the sidewall of the lens, and one of the two planar portions is adjacent to the reflective layer. The light emitted from the point light source irradiates the planar portions and is then reflected to the reflective layer for further utilization. Accordingly, the illumination device of this invention can have favorable light-emitting efficiency.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An illumination device comprising:
   a lens comprising:
      a surrounding sidewall comprising two planar portions and two arc-surface portions to surround a reference axis, the two planar portions being opposite to each other, the two arc-surface portions being opposite to each other;
      a light-incident surface located at one side of the surrounding sidewall to receive a light emitted from a point light source;
      a light-incident structure located on the light-incident surface and comprising a plurality of first bar-shaped protrusions, each of the first bar-shaped protrusions having at least one first light-diffusing surface not parallel to the light-incident surface; and
      a light-emitting surface located at the other side of the surrounding sidewall and being opposite to the light-incident surface, the light-emitting surface being substantially circular, a cross-section area of the lens gradually increasing from the light-incident surface to the light-emitting surface;
   a light guide cylinder configured at a side of the lens away from the point light source and substantially aligned to the reference axis; and
   a reflective layer configured at a side of the light guide cylinder and exposing an opposite side of the light guide cylinder, the reflective layer and one of the two planar portions being located at a same side of the reference axis, wherein the planar portions correspond to the reflective layer of the illumination device.

2. The illumination device as claimed in claim 1, wherein the reflective layer is a diffusive reflective layer.

3. The illumination device as claimed in claim 1, wherein a light-emitting center of the point light source is substantially aligned to the reference axis.

4. The illumination device as claimed in claim 1, each of the first bar-shaped protrusions of the light-incident structure having an extension direction, wherein a cross-section area of each of the first bar-shaped protrusions which takes the extension direction as a normal line has a V-shaped profile, an arc-shaped profile, or a polygonal profile.

5. The illumination device as claimed in claim 1, further comprising a light emitting structure configured on the light-emitting surface and substantially surrounding the reference axis.

6. The illumination device as claimed in claim 5, wherein the light-emitting structure comprises a plurality of second bar-shaped protrusions, each of the second bar-shaped protrusions having an extension direction, wherein a cross-section area of each of the second bar-shaped protrusions which takes the extension direction of the each of the second bar-shaped protrusions as a normal line has a rectangular profile, an arc-shaped profile, or a polygonal profile.

7. The illumination device as claimed in claim 6, each of the second bar-shaped protrusions comprising a plurality of planar second light-diffusing surfaces, wherein when the amount of the at least one first light-diffusing surface is plural, a first included angle is between the adjacent first light-diffusing surfaces, a second included angle is between the adjacent second light-diffusing surfaces, and the first included angle is less than the second included angle.

8. The illumination device as claimed in claim 5, wherein the light-emitting structure comprises a recess, such that a distance from any point of the light-emitting structure to the light-incident surface decreases together with a decrease in a distance from the any point of the light-emitting structure to the reference axis.

9. The illumination device as claimed in claim 1, wherein when the cross-section area of the lens takes the reference axis as a normal line, the two planar portions in the cross-section area are parallel to each other.

10. The illumination device as claimed in claim 1, wherein when the cross-section area of the lens takes the reference axis as a normal line, distances from the two arc-surface portions to the reference axis are equal and are greater than distances from the two planar portions to the reference axis in the cross-section area.

* * * * *